United States Patent [19]

Kozuki et al.

[11] Patent Number: 4,758,082
[45] Date of Patent: Jul. 19, 1988

[54] DISTANCE DETECTION APPARATUS

[75] Inventors: Susumu Kozuki; Masamichi Toyama, both of Tokyo; Akihiro Fujiwara; Naoya Kaneda, both of Yokohama; Youichi Iwasaki, Kawasaki; Koji Takahashi, Yokohama; Takashi Amikura, Tokyo; Toshihiko Nishikori, Sagamihara, all of Japan

[73] Assignee: Canon Kabushiki Kaisha, Tokyo, Japan

[21] Appl. No.: 851,088

[22] Filed: Apr. 14, 1986

[30] Foreign Application Priority Data

| Apr. 17, 1985 | [JP] | Japan | 60-080326 |
| Apr. 17, 1985 | [JP] | Japan | 60-080327 |
| Apr. 17, 1985 | [JP] | Japan | 60-080328 |
| Apr. 17, 1985 | [JP] | Japan | 60-080329 |

[51] Int. Cl.$^4$ ............ G01C 3/00; G03B 3/00
[52] U.S. Cl. .......................... 356/1; 354/403
[58] Field of Search ............ 356/1, 4, 141; 354/403, 354/406

[56] References Cited

U.S. PATENT DOCUMENTS

| 4,117,325 | 9/1978 | Halle et al. | 356/4 |
| 4,334,150 | 6/1982 | Herbst et al. | 356/4 |
| 4,334,151 | 6/1982 | Herbst et al. | 356/4 |
| 4,384,199 | 5/1983 | Ogino et al. | 356/4 |
| 4,529,304 | 7/1985 | Ogawa et al. | 354/403 |
| 4,542,971 | 9/1985 | Numata | 354/403 |
| 4,550,995 | 11/1985 | Toyama | 354/403 |
| 4,618,235 | 10/1986 | Ishida et al. | 354/403 |

Primary Examiner—Stephen C. Buczinski
Assistant Examiner—Linda J. Wallace
Attorney, Agent, or Firm—Fitzpatrick, Cella, Harper & Scinto

[57] ABSTRACT

The invention relates to an active type AF apparatus. In an AF type apparatus for radiating light from a projecting means to an object, receiving light reflected by the object by first and second photosensor portions, and obtaining distance data based on outputs form the photosensor portions, the signals from the first and second photosensor portions are time-divisionally integrated in the same direction by a single integrating circuit and distance data is obtained based on data on integrated values.

12 Claims, 12 Drawing Sheets

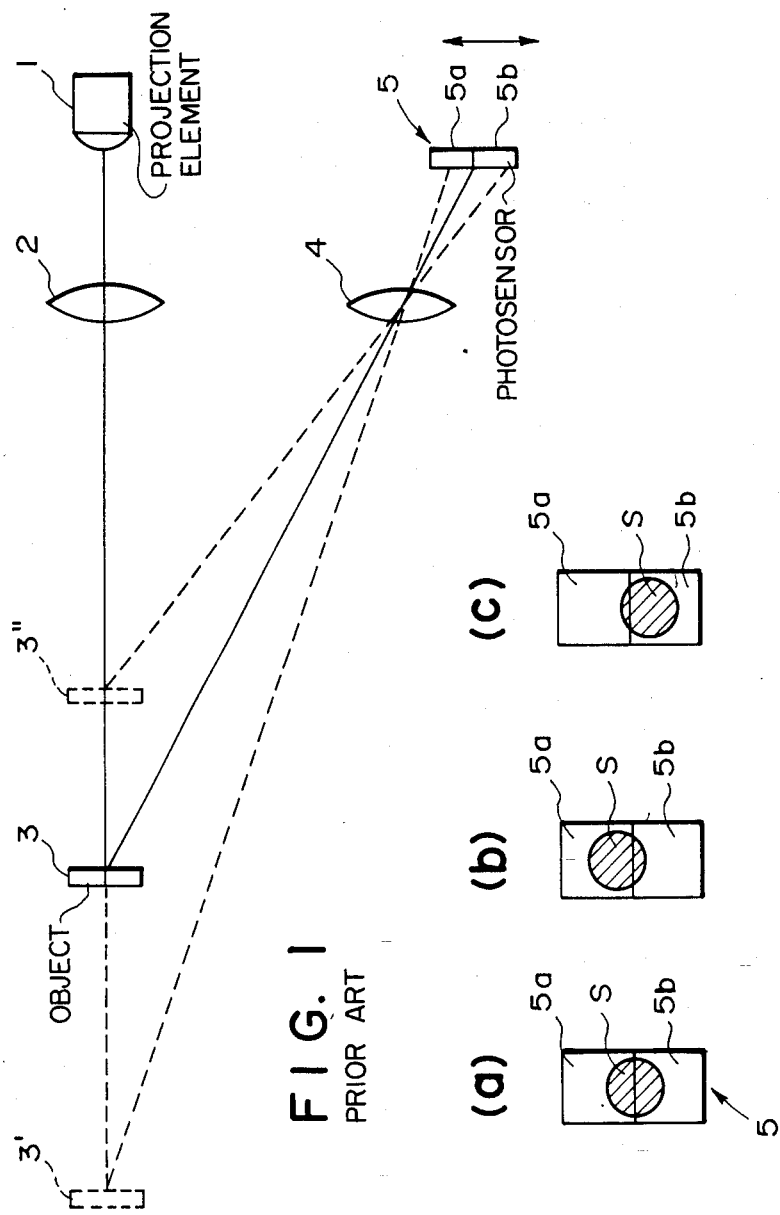

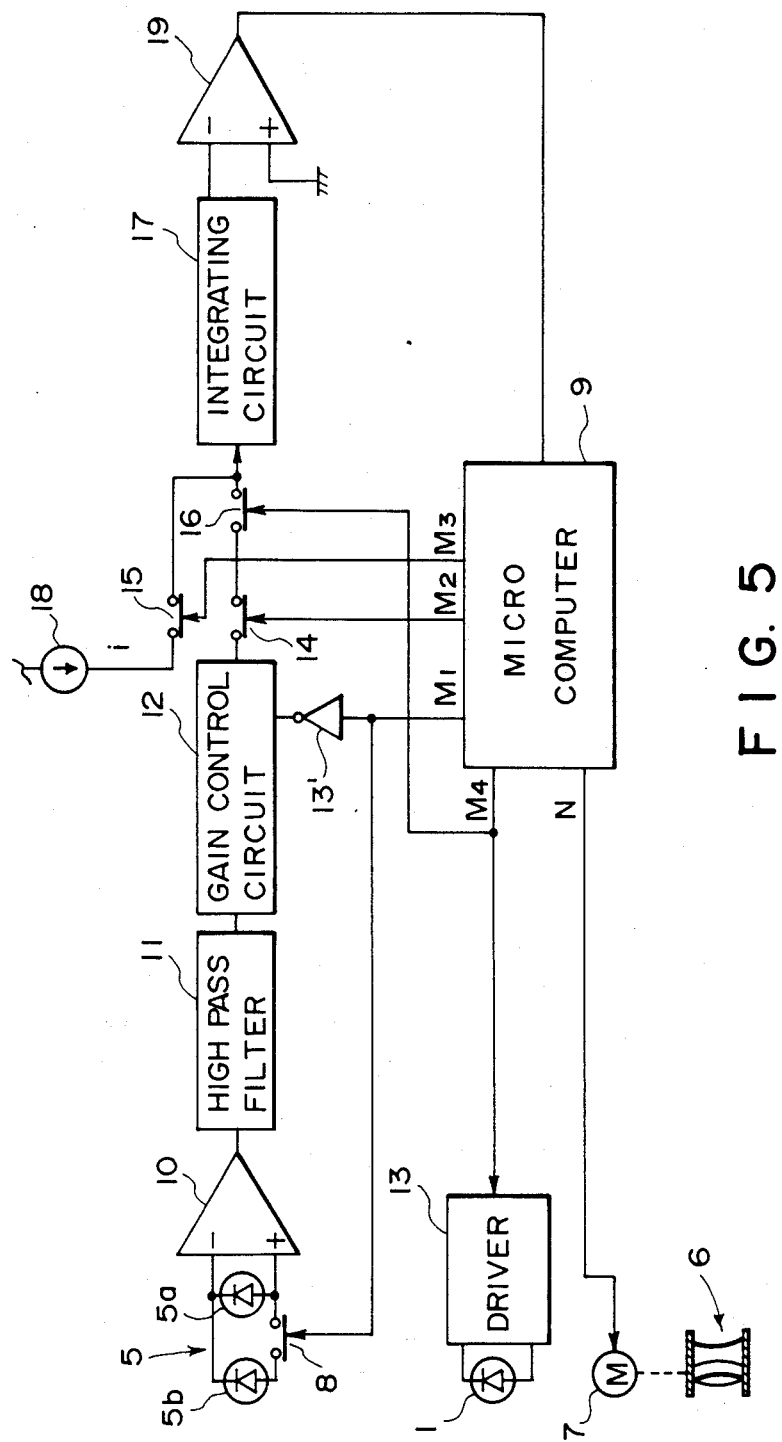
F I G. 5

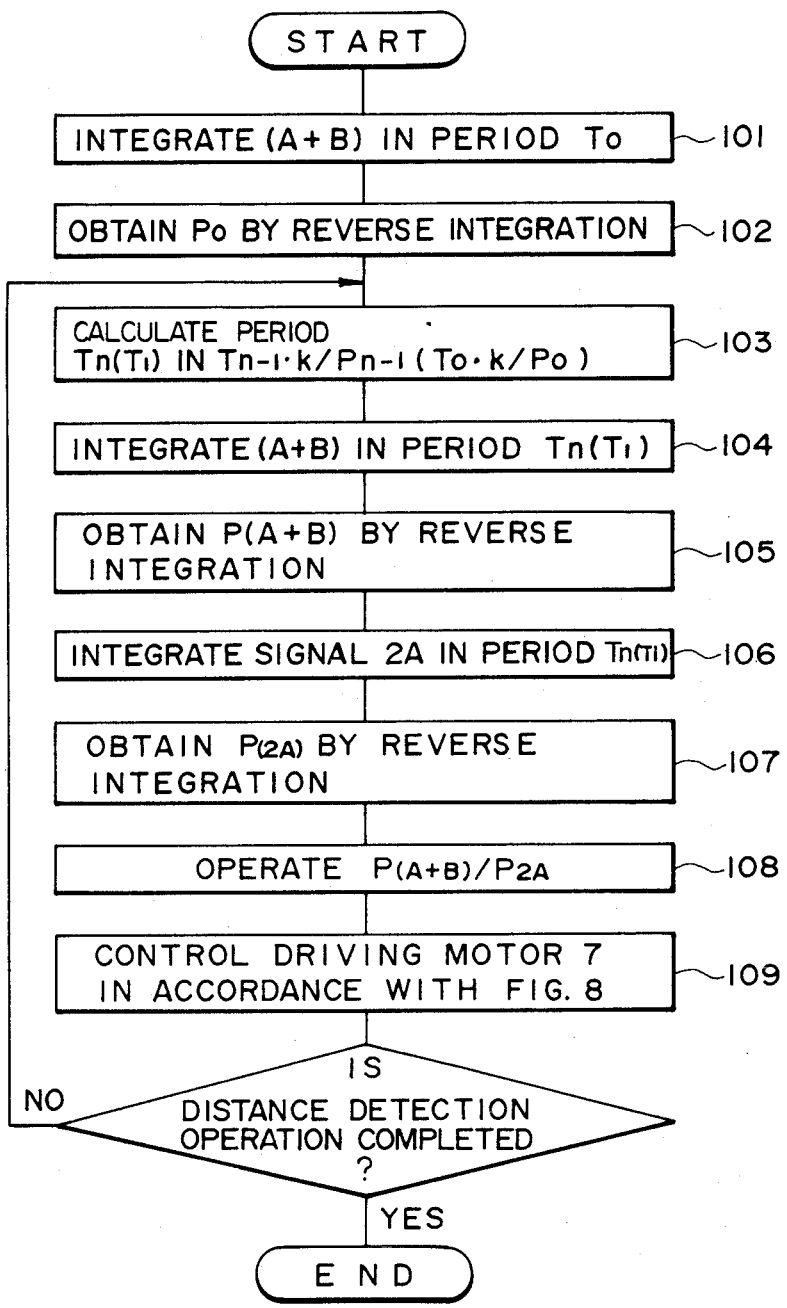
F I G. 7

| $P_{2A}/P_{A+B}$ | 0 | 0.2 | 0.4 | 0.6 | 0.8~1.2 | 1.4 | 1.6 | 1.8 | 2.0 |
|---|---|---|---|---|---|---|---|---|---|
| PWM(%) OF DRIVING MOTOR | 100 | 75 | 50 | 25 | 0 | 25 | 50 | 75 | 100 |

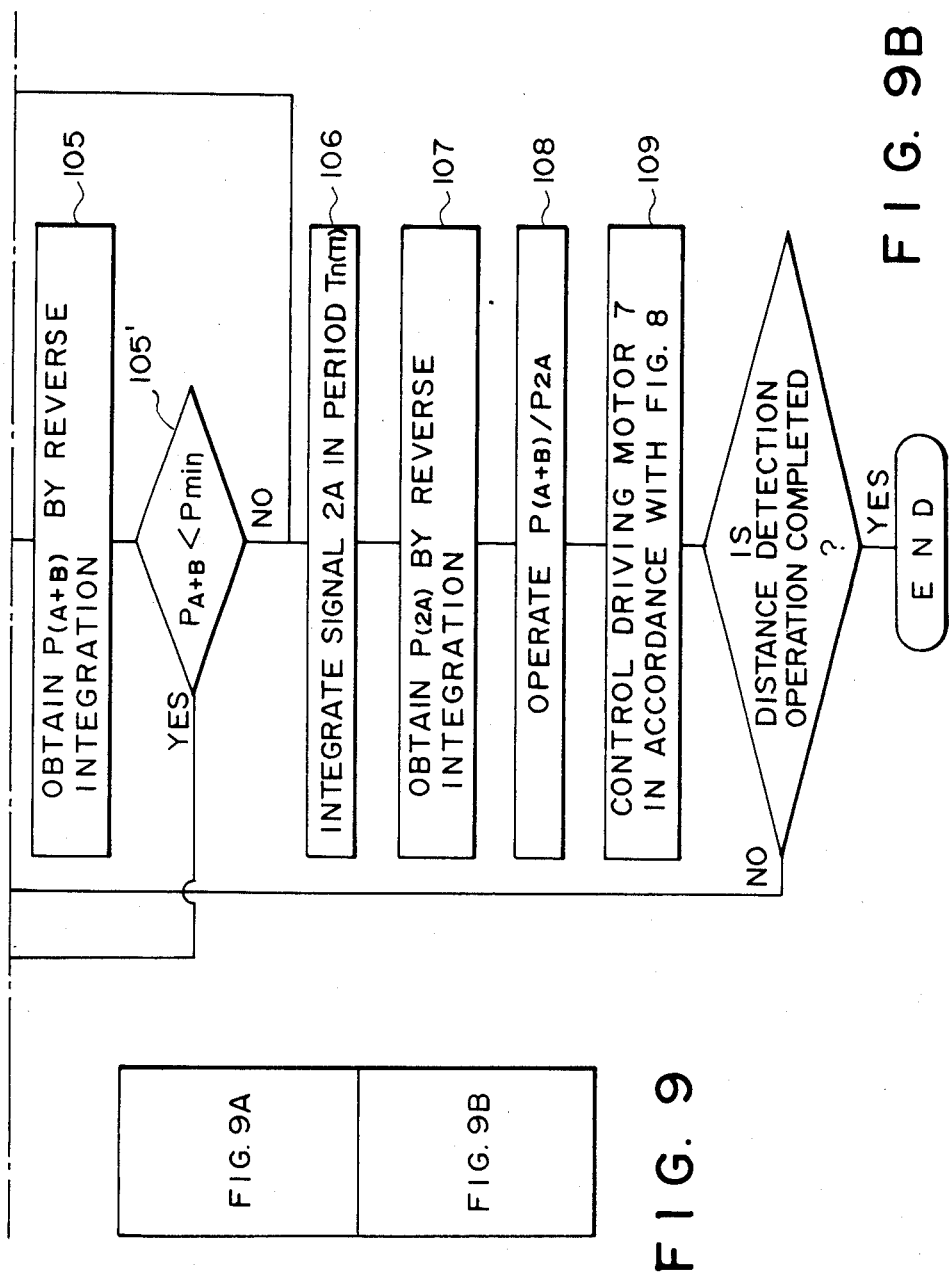

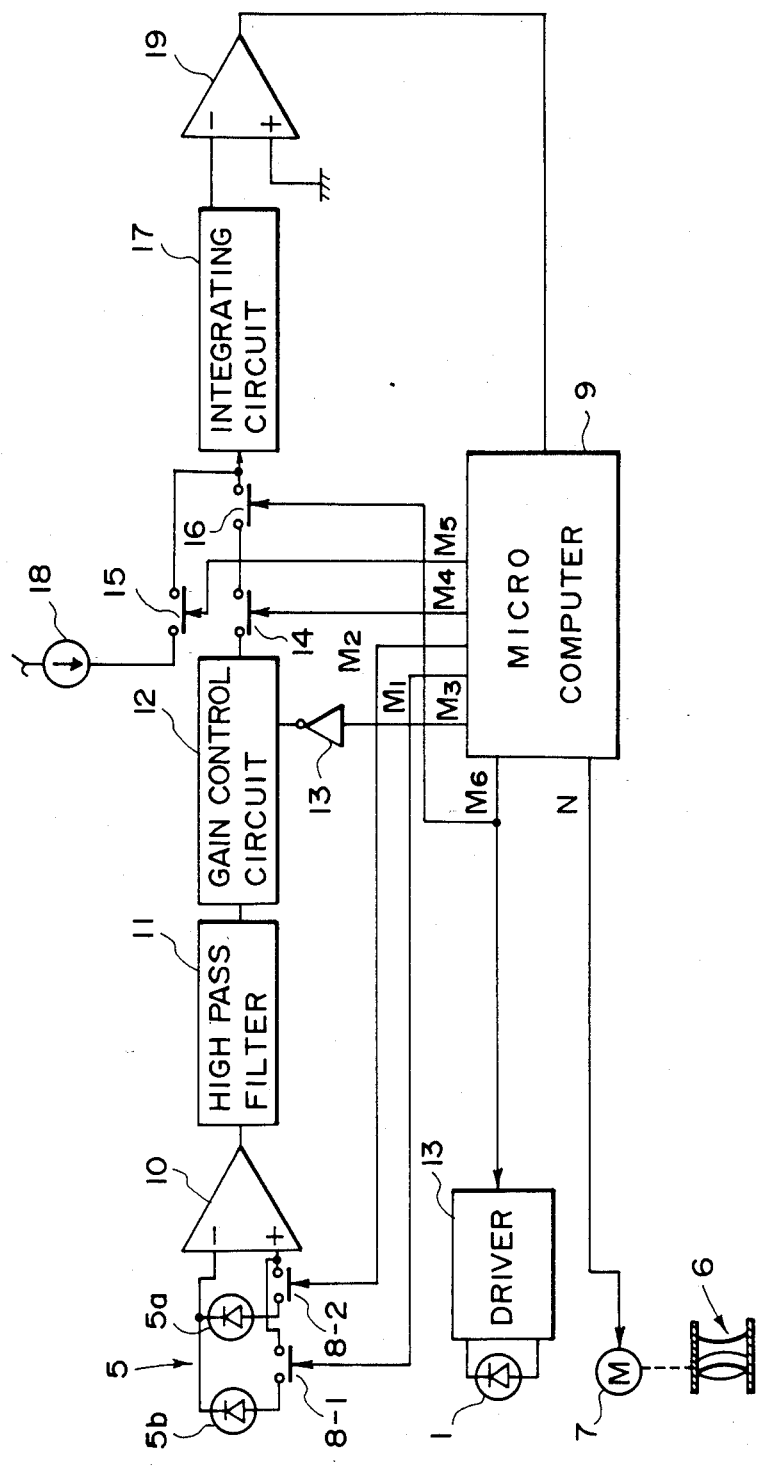
F I G. 10

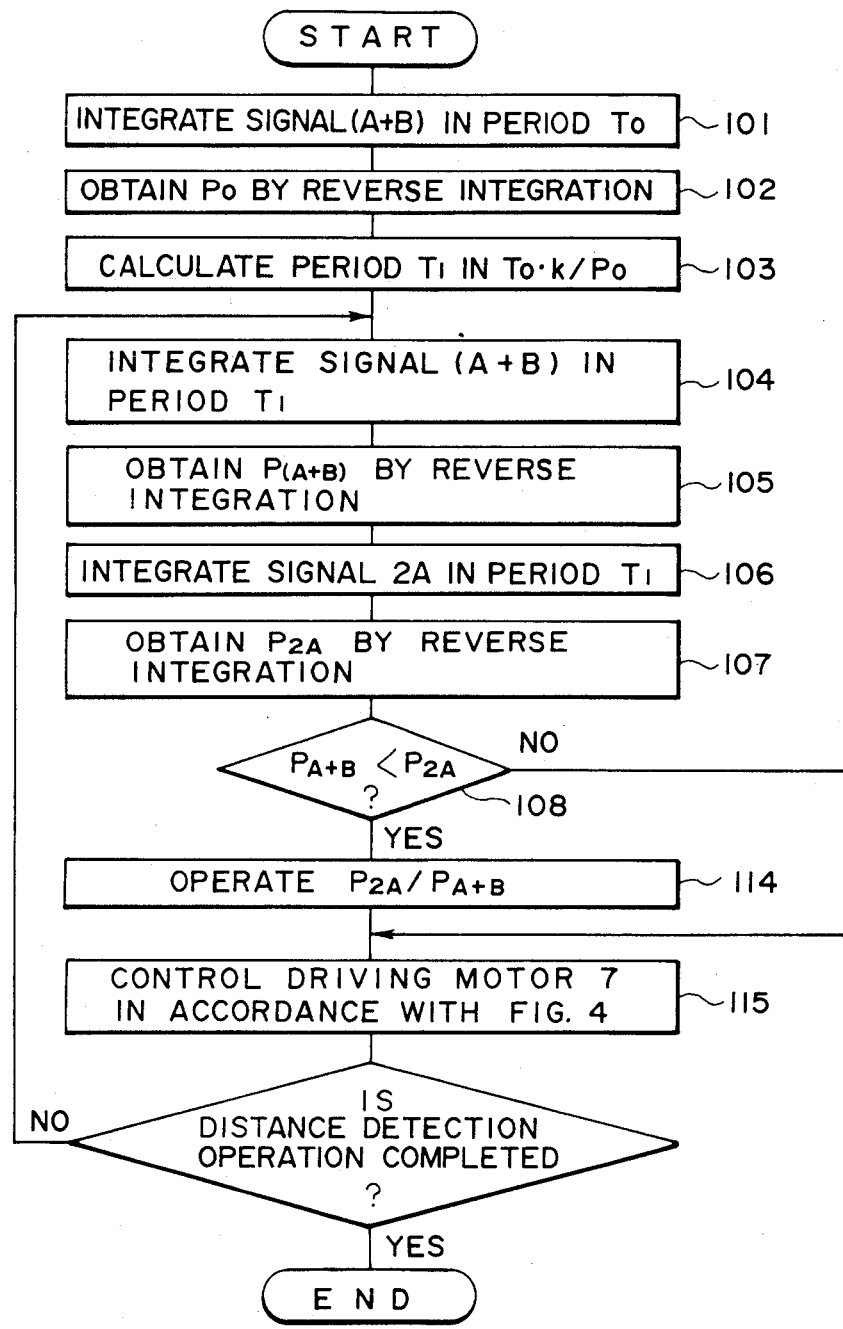
F I G. 12A

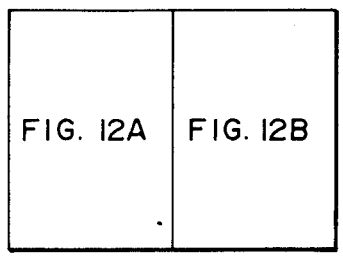
F I G. 12
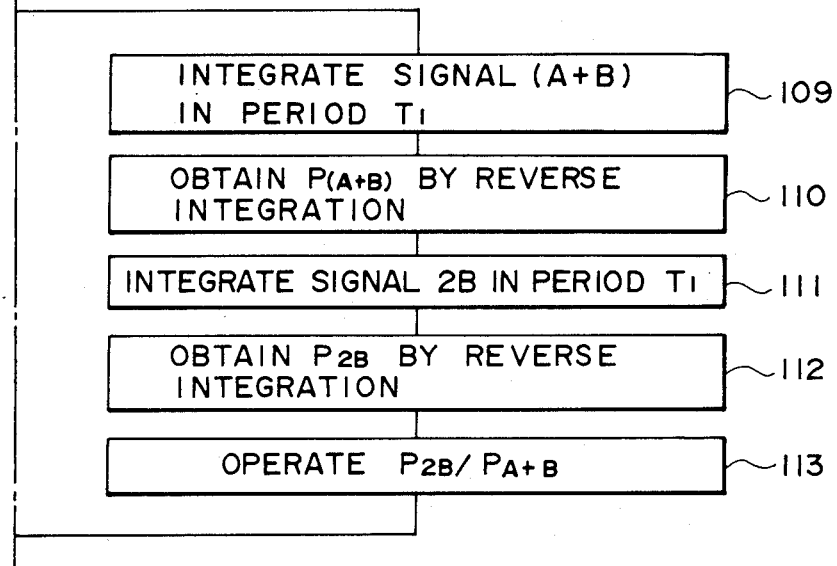
F I G. 12B

DISTANCE DETECTION APPARATUS

BACKGROUND OF THE INVENTION

1. Field of the Invention

The present invention relates to a distance detection apparatus used in an automatic focus control apparatus for a camera or the like and, more particularly, to an improvement in an active-type distance detection apparatus which obtains distance information by operating two signals.

2. Related Background Art

FIGS. 1 to 3 illustrate an example of an automatic focus control apparatus which has a conventional distance detection apparatus of the type described above. Referring to FIG. 1, a light beam from a projection element 1 passes through a projection lens 2, reflected by a surface of an object 3, passes through a light-receiving lens 4, and becomes incident on a photosensor 5. As can be seen from FIG. 2, the input surface of the photosensor 5 is divided into two photosensor portions 5a and 5b. The beam incident on the portions 5a and 5b are photoelectrically converted thereby, and distance information is obtained based on the outputs from the portions 5a and 5b. As indicated by the solid line in FIG. 1, when the light beam reflected by the object 3 becomes as a beam spot S (FIG. 2) at the center between the portions 5a and 5b, the respective portions 5a and 5b receive the same amount of light, as shown in FIG. 2a. When the object is far as indicated by 3', the portion 5a receives a large amount of light and the portion 5b receives a small amount of light, as shown in FIG. 2b. When the object is near as indicated by 3", the portion 5b receives a large amount of light and the portion 5a receives a small amount of light, as shown in FIG. 2c. In other words, when the two portions 5a and 5b receive the same amount of light, as shown in FIG. 2a, the in-focus state is detected. When the state shown in FIG. 2b is detected, the near-in-focus state is detected. When the state shown in FIG. 2c is detected, the far-in-focus state is detected. In the case of near- or far-in-focus state, the photosensor 5 (along the directions indicated by the arrows of FIG. 1) is moved in synchronism with the imaging lens so as to perform automatic focusing control.

The automatic focusing control operation will be described with reference to a block diagram shown in FIG. 3. The photosensor 5 is moved in synchronism with the projection lens 6. More specifically, when a driving motor 7 is driven, the photosensor 7 is moved through a cam and the like. The outputs of the portions 5a and 5b are respectively connected to sense amplifiers 8a and 8b, DC component eliminating high pass filters 9a and 9b, analog switches 10a and 10b as detectors, and integrating circuits 11a and 11b. A microcomputer 12 supplies pulse signals to the projection element 1 and the analog switches 10a and 10b through a driver 13. In response to the pulses, the projection element 1 generates pulse beams. The analog switches 10a and 10b are turned on only during the emitting periods of the projection element 1 to supply input signals A and B received from the sense amplifiers 8a and 8b through the high pass filters 9a and 9b to the integrating circuits 11a and 11b. The signals A and B are integrated by the integrating circuits 11a and 11b and the integrated outputs are supplied to an adder 14 and a subtractor 15, respectively. The adder 14 and the subtractor 15 calculate sum and difference signals (A+B) and (A−B) and supply them to the microcomputer 12. The microcomputer 12 discriminates if the imaging lens is in the in-focus state or the out-of-focus state (near-in-focus state or far-in-focus state) in accordance with whether the integrated value of the sum signal (A+B) has reached a predetermined value VH and with whether the integrated value of the difference signal (A−B) has exceeded a threshold value ±VD. More specifically, when the sum signal (A+B) has reached the predetermined value VH and the difference signal (A−B) has not exceeded the threshold value ±VD, the microcomputer 12 determines that the imaging lens is focused. When the difference signal (A−B) exceeds the threshold value ±VD before the sum signal (A+B) reaches the predetermined value VH, the microcomputer 12 determines that the imaging lens is out of focus. In the latter case, the microcomputer 12 supplies an automatic focus control signal N to the driving motor 7 to move the projection lens 6 and the photosensor 5 in predetermined directions. When the outputs from the portions 5a and 5b indicate substantially an equal input light amount after this automatic focus control, the movement of the projection lens 6 is stopped, i.e., the automatic focus control signal N is disabled.

As described above, in the conventional apparatus shown in FIG. 3, the signals A and B from the portions 5a and 5b are integrated at the same time, distance information is calculated in accordance with the two integrated values, and automatic focus control is performed in accordance with the calculation results. For this purpose, two circuits are required: a circuit for processing the signal A (from the sense amplifier 8a to the integrating circuit 11a) and a circuit for processing the signal B (from the sense amplifier 8b to the integrating circuit 11b). This results in a complicated and large circuit and two difference sets of circuit characteristics must be set and controlled (gain, offset voltage and the like).

The present applicant has previously proposed an apparatus wherein signals A and B are time-divisionally processed, i.e., one signal, e.g., the signal A is integrated by a known Miller integrating circuit for a predetermined time period t1 (FIG. 4), and reverse integration is performed using the sum signal (A+B), as per Japanese Patent Application Laid open No. 19116/1985. Although this apparatus results in a small circuit and need not have two sets of characteristics, it has the following problems. When the signal A is integrated for a time period t1, the integrated value is At1. When the sum signal (A+B) is integrated for a time period t2, the integrated value is (A+B)t2. This apparatus thus performs reverse integration for the time period t2 required that an output level VT of the Miller integrating circuit after the time period t1 becomes an initial level V0 (i.e., the apparatus performs reverse integration such that the two integrated values equal each other). The distance information is calculated in accordance with the ratio t1/t2. When this method is adopted in the conventional apparatus shown in FIG. 3 (of the type wherein the in-focus state is detected when an equal amount of light becomes incident on the portions 5a and 5b), assuming the fact that the light reflected by the object in the in-focus state becomes incident at the center of the photosensor, the in-focus state is detected when t2=t1/2. Therefore, the relation A=B can be confirmed from $At1=(A+B)t2$ and $t2=t1/2$. In integration processing of any kind, an offset voltage caused by integration of a small DC drift current is always involved. When a drift signal is represented by D, the above relation can be rewritten as $(A+D)t1 = (A+B-D)t2$. Since the in-focus state is detected if $t2 = t1/2$, a relation $A = B - 3D$ is obtained and this reveals that a distance detection error has occurred due to the offset voltage. In order to remove such an error, zero adjustment of the offset voltage must be performed with care. If the offset voltage changes due to temperature changes or the like after such zero adjustment is made, an automatic offset voltage adjustment circuit must be added to compensate for such changes in offset voltage.

In such an apparatus, the output signals from the portions 5a and 5b largely fluctuate in accordance with object conditions. More specifically, when the object distance is short and the object has a high reflectivity, the output signal levels from the portions 5a and 5b become high. When the object distance is far and the object has a low reflectivity, the output signal levels become low. When the output signal levels from the portions 5a and 5b largely fluctuate in this manner, the signals may fall outside the dynamic range (the signal levels approach the power source voltage and saturate) of the circuit, and correct distance detection cannot then be performed.

In a conventional apparatus of this configuration, infinite distance is determined when the integrated values over a certain time period of the signals from the portions 5a and 5b are lower than an infinity threshold level. The output signals from the portions 5a and 5b are influenced by the reflectivity of the object. Therefore, even for objects at the same distance, if the projection spot is incident on an object portion having a low reflectivity, the resultant integrated values may be smaller than a predetermined value. In this case, the object at a detectable distance may be detected to be at an infinite distance.

In the apparatus previously proposed by the present applicant, distance information is obtained from the sum signal (A+B) and the signal A. Therefore, when a larger portion of the spot S is incident on the portion 5b, the level of the signal A becomes very low. In this case, the S/N ratio is low and distance information cannot be obtained with high precision.

SUMMARY OF THE INVENTION

It is an object of the present invention to provide a distance detection apparatus wherein an integrating means time-divisionally integrates two signals (A+B) and A or B in the same integrating direction, an operation means calculates distance information in accordance with the obtained integrated values, and an offset voltage of the integrating means is cancelled.

It is another object of the present invention to provide a distance detection apparatus which can change the integration period for the signals from the photosensor portions in accordance with their levels so as to prevent saturation of the integrated signals.

It is still another object of the present invention to provide a distance detection apparatus which can perform infinity distance detection of an object without being influenced by the reflectivity of the object.

It is still another object of the present invention to provide a distance detection apparatus which can obtain signals with a high S/N ratio when distance information is calculated from the sum signal of the signals from the two photosensor portions and the signal from one of the portions.

The above and other objects, features and advantages of the present invention will become apparent from the following description taken in conjunction with the accompanying drawings.

BRIEF DESCRIPTION OF THE DRAWINGS

FIG. 1 is a schematic diagram showing a part of a distance detection optical system used in a conventional automatic focus control apparatus;

FIGS. 2(a), 2(b) and 2(c) are diagrams showing the incident states of the beam spot corresponding to the different positions of the object;

FIG. 5 is a block diagram of a distance detection apparatus according to an embodiment of the present invention;

FIG. 7 is a flow chart showing an operation sequence of the embodiment shown in FIG. 5;

FIG. 10 is a circuit diagram of a distance detection apparatus according to another embodiment of the present invention;

FIG. 12 is a flow chart for explaining an operation sequence of the embodiment shown in FIG. 10.

DESCRIPTION OF THE PREFERRED EMBODIMENTS

Figure 3:
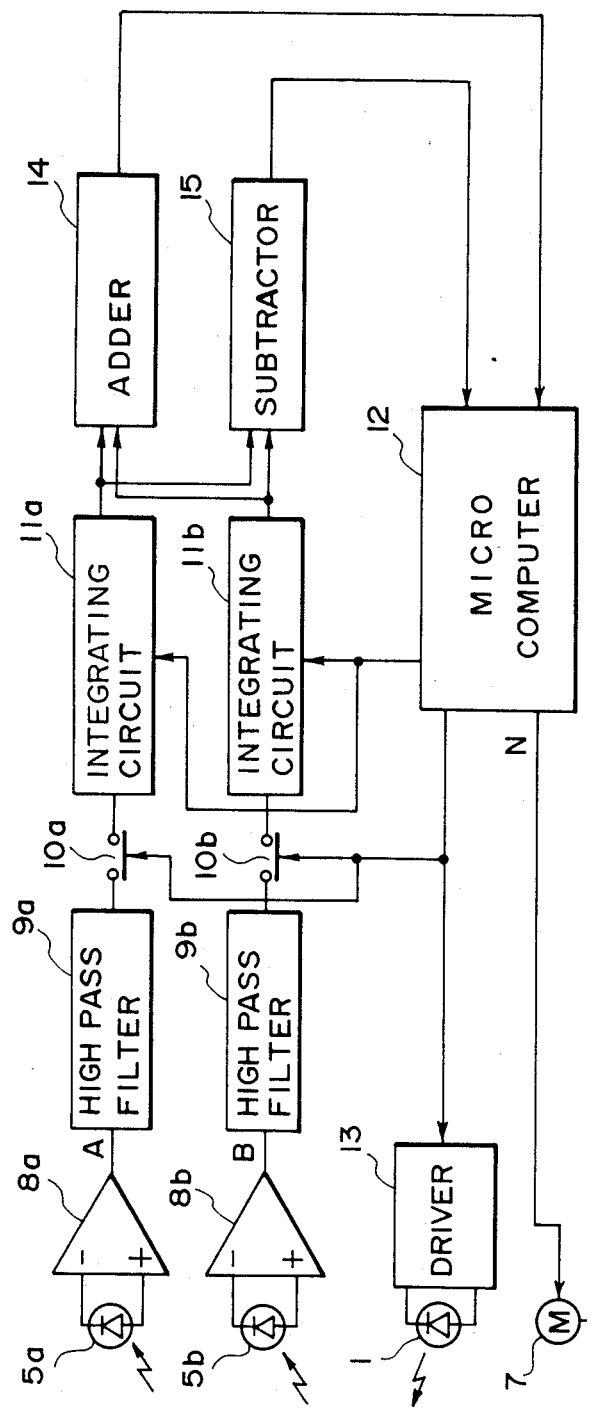
FIG. 3 is a block diagram of a conventional automatic focus control apparatus having two series of circuits.
Figure 4:
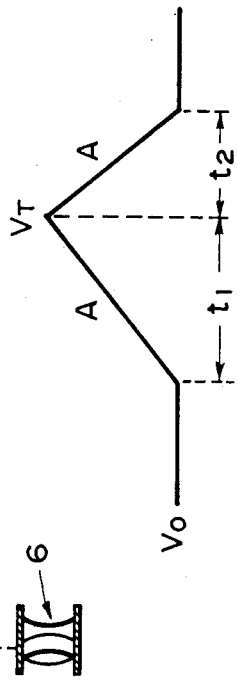
FIG. 4 is a diagram for explaining the integration operation of the two signals in a conventional automatic focus control apparatus having one series of circuits.

The preferred embodiments of the present invention will be described in detail with reference to the accompanying drawings.

FIG. 5 is a block diagram showing an embodiment of the present invention. The same reference numerals as in FIGS. 2 and 3 denote the same parts in FIG. 5. An imaging lens 6 is moved by a driving motor 7. When the lens 6 is moved, a photosensor 5 is synchronously moved (in practice, the photosensor 5 is moved through a cam etc., and the like when the driving motor 7 is driven). An analog switch 8 is turned on in response to a timing signal M1 from a microcomputer 9. While the analog switch 8 is ON, both portions 5a and 5b of the photosensor 5 receive light reflected by an object. While the analog switch 8 is OFF, only the portion 5a receives light. A series circuit of a sense amplifier 10, a high pass filter 11 and a gain control circuit 12 is connected to the output side of the photosensor 5. The high pass filter 11 removes the DC component (ambient light component) from the input signal. The gain control circuit 12 controls the gain of the input sum signal (A+B) or the input signal A in accordance with an input signal received from the microcomputer 9 through an inverter 13. When a timing signal M1 from the microcomputer 9 is at high level (this means that the sum signal (A+B) is being received), the gain control circuit 12 sets a gain of 1 to directly output the input signal. However, when the timing signal M1 is at low level (this means that the signal A is being received), the gain control circuit 12 sets a gain of 2 to output the signal amplified at the gain of 2. Analog switches 14 and 15 are turned on in response to timing signals M2 and M3, respectively, from the microcomputer 9. An analog switch 16 is turned on in response to a timing signal M4 (pulse signal) from the microcomputer. A constant current source 18 is connected to the input side of an integrating circuit 17 and flows a constant (e.g., negative) current i of the opposite polarity to that of the signals A and B. The constant current source 18 is used for performing reverse integration ("reverse integration" here means an integration in the negative direction) of the integrated value of the sum signal (A+B) or the signal 2A. A comparator 19 supplies a low-level signal to the microcomputer 9 when the reverse integration of the integrated value of the sum signal (A+B) or the signal 2A is completed. The microcomputer 19 has an internal counter for counting pulses. A driving circuit 13 is for driving a projection element 1.

Figure 6:
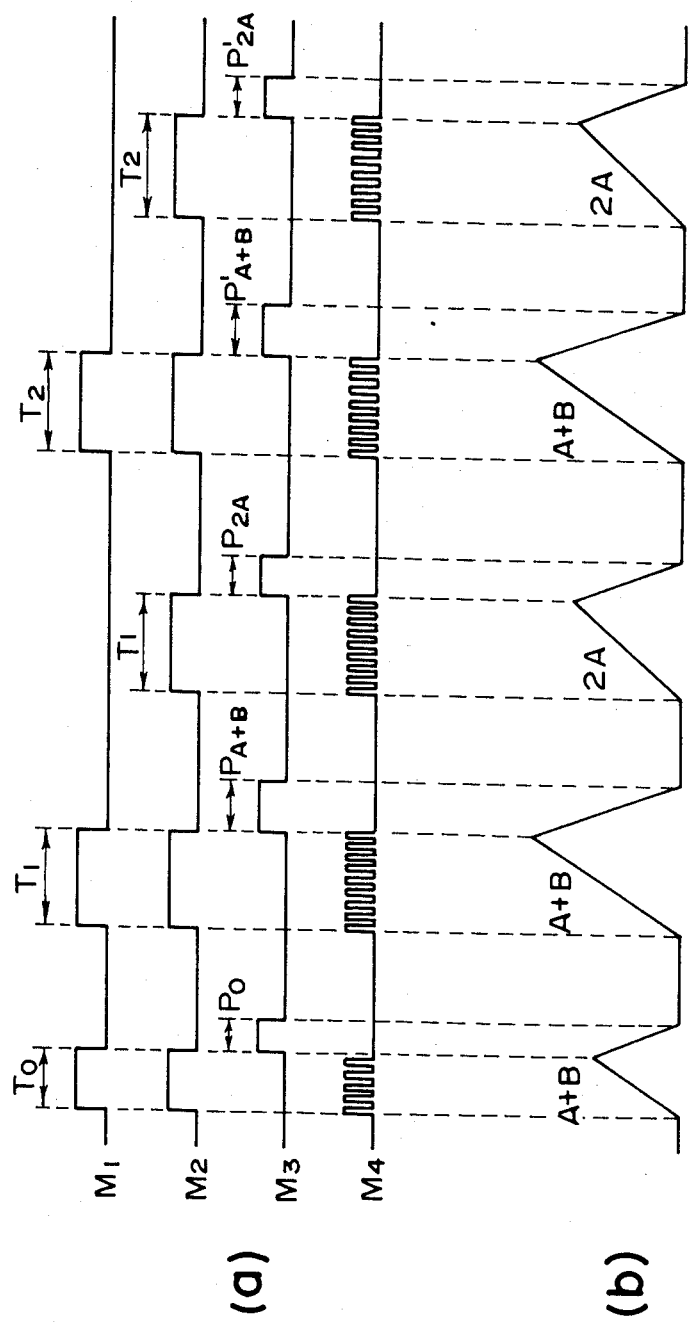
FIGS. 6(a) and 6(b) are timing charts for explaining the mode of operation of the embodiment shown in FIG. 5.

The mode of operation of the embodiment shown in FIG. 5 will be described with reference to FIGS. 6 and 7. The microcomputer 9 executes steps in the flow shown in FIG. 7. First, the microcomputer 9 generates a timing signal M1 to turn on the analog switch 8 for a preset time period $T_0$. When the analog switch 8 is turned on, the projection element 1 projects light, and light reflected by an object is received by the portions 5a and 5b. The sense amplifier 10 outputs the sum signal (A+B). The timing signal M1 is also supplied as a low-level signal to the gain control circuit 12 through the inverter 13. Therefore, the gain control circuit 12 supplies the sum signal (A+B) from the high pass filter 11 to the analog switch 14 without increasing its gain. As can be seen from FIG. 6(a), since the microcomputer 9 is generating timing signals M2 and M4 at this time, the analog switches 14 and 16 are turned on and off by the signals M2 and M4, respectively, i.e., turned on in accordance with the corresponding projection timings of the element 1. Therefore, the sum signal (A+B) from the gain control circuit 12 is supplied to the integrating circuit 17 through the analog switches 14 and 16 and is integrated for a time period $T_0$ as shown in FIG. 6(b 0 (step 101 in FIG. 7). When the sum signal (A+B) is integrated by the integrating circuit 17 for the time period $T_0$ in this manner, the microcomputer 9 starts generating a timing signal M3 to turn on the analog switch 15. When the analog switch 15 is turned on, reverse integration is started (FIG. 6(b)) by the constant current i from the constant current source 18. Reverse integration is continued until a low-level signal is generated by the microcomputer 9. During this time period (reverse integration period), the internal counter of the microcomputer counts pulses generated by the internal pulse generator therein. When the count of pulses is represented by $P_0$, it provides an A/D conversion value (digital signal) corresponding to the integrated value of the sum signal (A+B) (step 102).

When the number of pulses $P_0$ is obtained by the above-mentioned distance pre-detection, the integrating circuit 17 calculates an integration period suitable for integrating the sum signal (A+B). As described above, when the distances to the object or the object reflectivities are different, and the sum signal (A+B) is integrated for a preset time period, the integrated value largely fluctuates and may exceed the dynamic range (the integrated value of the sum signal (A+B) approaches the power source voltage and saturates) depending upon conditions of a particular object to be photographed. In order to prevent this, the integration period of the sum signal (A+B) is suitably adjusted. That is, when the integrated value of the sum signal (A+B) is large, the integration period is shortened. When the integrated value of the sum signal (A+B) is small, the integration period is prolonged. For this purpose, the microcomputer 9 performs the following calculation so as to determine the next integration period of the sum signal (A+B):

$$T_n = T_{n-1} \cdot k / P_{n-1}$$

where k is a constant and $T_n$ is the next integration period. When the integration period is calculated in this manner (current integration period is $T_1 = T_0 \cdot k / P_0$) (step 103), the microcomputer 9 outputs $T_1$ period timing signals M1, M2 and M4. Then, integration of the sum signal (A+B) is performed for the time period $T_1$ (step 104). Since a timing signal M3 is then output, reverse integration is performed by the constant current i until the comparator 19 generates a low-level signal. Thus, the number of pulses $P_{A+B}$ as an A/D converted value or digital signal of the integrated value of the sum signal (A+B) is obtained (step 105). The number of pulses $P_{A+B}$ is stored in the microcomputer 9. When this operation is completed, the microcomputer 9 generates timing signals M2 and M4 again (FIG. 6(a)). In this case, since a timing signal M1 is not generated, the analog switch 8 is OFF and the gain control circuit 12 is set in the mode for setting a gain of 2. Therefore, only the portion 5a receives light and a signal 2A double the output signal A from the portion 5a is integrated (step 106). In the same manner as described above, a timing signal M3 is generated and reverse integration is performed by the constant current i and the number of pulses $P_{2A}$ is obtained by A/D conversion of the integrated value of the signal 2A (step 107).

Figures 8, 13:
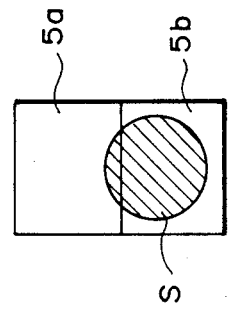
FIG. 8 is a table for explaining the mode of operation of the embodiment shown in FIG. 5.
FIG. 13 is a diagram for explaining the operation of the embodiment shown in FIG. 10.

Based on the numbers of pulses $P_{A+B}$ and $P_{2A}$ obtained in this manner, the microcomputer 9 performs an operation, as shown in FIG. 8, so as to detect the in-focus state or the out-of-focus state (near-in-focus state or far-in-focus state). At the same time, the microcomputer 9 modulates (PWM) the pulse width of the automatic focus control signal N (FIG. 5) supplied to the driving motor 7. Thus, the rotational direction and speed of the driving motor 7 are controlled. In this embodiment, as shown in FIG. 8, when $P_{2A}/PA_{A+B}$ falls within a range of 0.8 to 1.2, the in-focus state is detected and an automatic focus control signal N is not supplied to the driving motor 7 (no voltage is applied). The range (0.8 to 1.2, is a dead zone. Ideally, the value "1.0" (i.e., $2A = A+B$ or $A = B$) is the true in-focus state. However, in this embodiment, a margin is provided. The number of pulses $P_{A+B}$ stored in the microcomputer 9 is used to set the integration period (period $T_2$ shown in FIG. 6) of the sum signal (A+B) for the next distance detection as the number of pulses $P_0$ described above, and distance detection is performed in a similar manner (steps 103 to 109). Thereafter, the number of pulses $P'_{A+B}$ obtained in the period $T_2$ is used for setting the next integration period (period $T_3$)

In this manner, according to this embodiment, when the number of pulses $P'_{A+B}$ in the previous integration period (period $T_{n-1}$) is large, the current integration period (period $T_n$) is shortened. Therefore, even if the amount of light received from the object is small or large, correct distance detection can be performed.

The integrated value of the sum signal (A+B) for the time period $T_1$ can be represented by $(A+B)T_1$. When the time required for performing reverse integration of this integrated value by the constant current i is represented by $T'_1$, the integrated value obtained by reverse integration at the constant current i for the period $T'_1$ is $iT'_1$. The two integrated values are equal to each other, i.e., $(A+B)T_1=iT'_1$. Similarly, when the integrated value of the signal 2A for the period $T_1$ is represented by $2AT_1$ and the time required for performing reverse integration of this value by the constant current i is represented by $T''_1$, the integrated value obtained by reverse integration by the constant current i for the period $T''_1$ is $iT''_1$. The two integrated values are equal to each other in this case as well, i.e., $2AT_1=iT''_1$. In the in-focus state, since $T'_1=T''_1$, then A=B from the above two relations. Assuming a case wherein a drift signal D is present, the relations become:

$$(A+B+D)T_1=(i-D)T'_1$$

$$(2A+D)T_1=(i-D)T''_1$$

Since the in-focus state can be detected when $T'_1=T_{411}$, the relation A=B can be confirmed. In an apparatus as in this embodiment which obtains distance information based on the integrated value of the sum signal (A+B) and the integrated value of the signal 2A (may be the signal 2B), a measurement error due to an offset voltage is not caused. In one conventional apparatus described above, the offset voltage is not cancelled (A=B−3D) whereas it is in this embodiment (A=B) and the zero adjustment of the offset voltage is not required. Even if the offset voltage changes in accordance with the temperature changes, the offset voltage can be cancelled as described above, thus eliminating an automatic offset voltage adjustment circuit. Therefore, the circuit does not become complex and correct distance information can be obtained.

In this embodiment, when only one signal is integrated, the gain control circuit 20 is used to double the signal and the doubled signal is integrated. This aims at cancelling the offset voltage when the sum signal and one signal are respectively integrated. However, the present invention is not limited to this. For example, the integrated value of one signal is A/D converted and doubled, and the doubled value is compared with the A/D converted value of the integrated value of the sum signal to perform motor control and automatic focus control in accordance with the comparison results. When a drift signal D is present in this case, $$(A+B+D)T_1=(i-D)T'_1$$

$$(A+D)T_1=(i-D)T''_1$$

Since the in-focus state is detected in this case when $T'_1=2T''_1$, these relations derive $A=B-D$. In this case, although there is a slight influence of the offset voltage, a measurement error is small and zero adjustment of the offset voltage can be performed easily. In place of using one signal A or B, the difference signal (A−B) between the two signals A and B can be used. In this case, the integrated value of the difference signal (A−B) is calculated, and distance information is calculated in accordance with the integrated values of the difference and sum signals (A−B) and (A+B). In addition, the signals A and B can be integrated and, for example, $2A/(A+B)$ and $(A-B)/(A+B)$ can be calculated from the integrated values so as to obtain distance information. The light-receiving element used is the photosensor 3 consisting of portions 5a and 5b in the above embodiment. However, two photosensors can be used, and a semiconductor position detector (PSD) can be used.

Figure 9A:
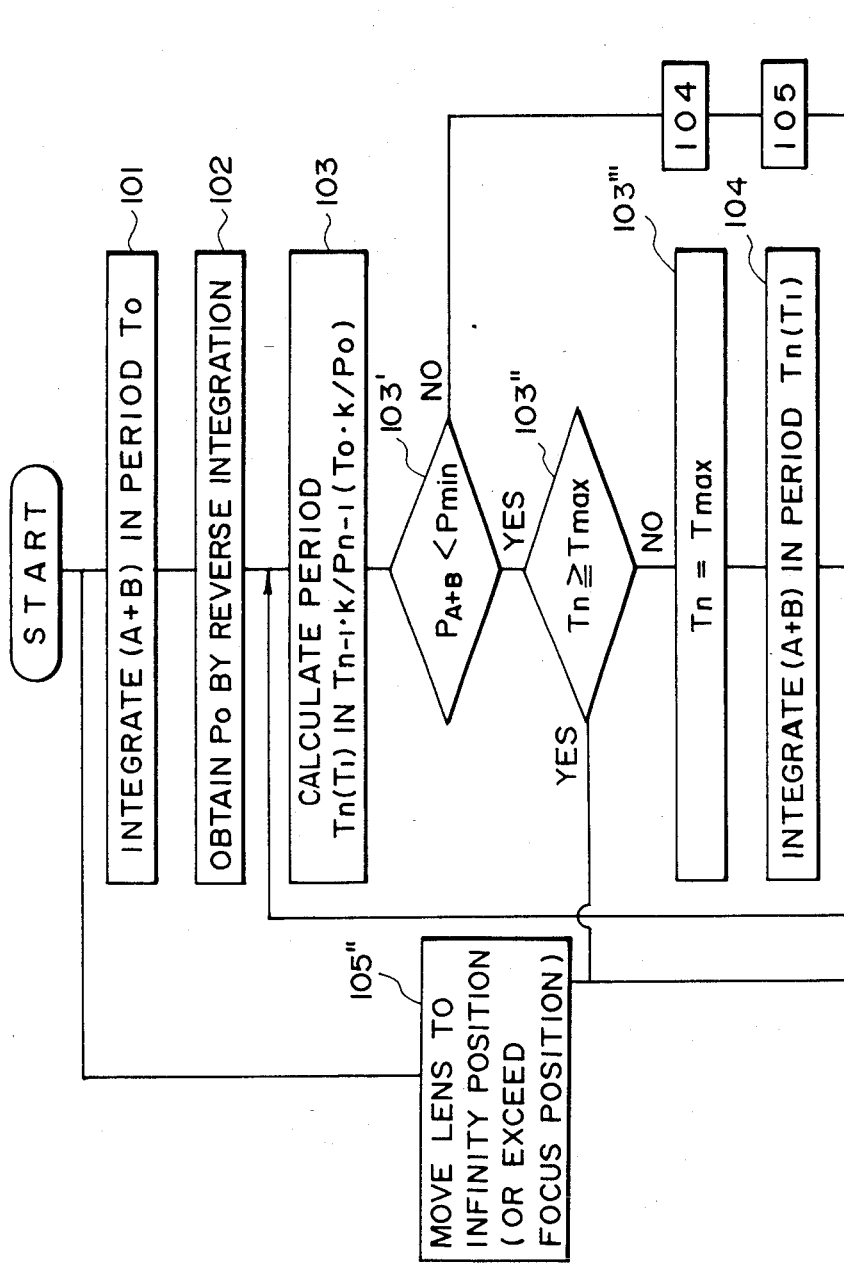
FIG. 9 is a flow chart for explaining another operation sequence of the embodiment shown in FIG. 5.

FIG. 9 shows a flow wherein the program flow in the computer 9 shown in FIG. 5 is partially modified. The same numbers in FIG. 9 denote the same steps as in FIG. 7. However, according to the flow shown in FIG. 9, when an object is at an infinity position, the circuit shown in FIG. 5 can be operated to position the lens at the infinity position or the exceed focus position.

When the object is within a measurable range and has a high reflectivity, $P_{A+B}>P_{min}$ is obtained in step 103′. Therefore, since the operation becomes the same as that according to the flow shown in FIG. 7, it is not described again.

A case will now be described wherein the object is at the infinite position or within a measurable range and a projection spot is incident on an object portion which has a low reflectivity. In this case, as in the flow shown in FIG. 7, the sum signal (A+B) is integrated for the period $T_0$ by various timing signals from the microcomputer 9 and the number of pulses $P_0$ is obtained. In such a case, almost no light is reflected and returns or only very weak light returns, and we have $P\approx 0$. Therefore, the next integration period (period $T_1$) obtained from the relation $(T_1=T_0k/P_0)$ becomes an infinite value. Since this is not ideal in view of the response characteristics or the like, in the flow shown in FIG. 9, a maximum integration period $(T_{max})$ is preset in accordance with the required response time. In addition, in order to determine an infinite distance when the number of pulses $P_{A+B}$ is smaller than a predetermined value, a minimum number of pulses $P_{min}$ is also preset in accordance with various object conditions and noise reduction. In this manner, in the flow shown in FIG. 9, the maximum and minimum numbers of pulses $T_{max}$ and $T_{min}$ are preset as a reference for determining the infinity position. When the microcomputer 9 detects that the period $T_n$ (integration period) and the number of pulses $P_{A+B}$ ($P'_{A+B}$, ...) satisfy the following conditions, it determines that the object is at the infinity position. That is, the microcomputer 9 checks if the number of pulses $P_{A+B}$ ($P'_{A+B}$, ...) is smaller than the minimum number of pulses $P_{min}$. If the number of pulses $P_{A+B}$ is smaller than the minimum number of pulses $P_{min}$, the microcomputer 9 then checks if the current integration period (period $T_n$) is equal to the maximum integration period $(T_{max})$ (step 103″). If the period $T_n$ has reached the time $T_{max}$, the microcomputer 9 determines that the object is at the infinity position and supplies an automatic focus control signal N to the driving motor 7 to move the imaging lens 6 to the infinity position (or exceed focus position) (step 105″). If the period $T_n$ is shorter than the time $T_{max}$, the integration period (period $T_n$) is set at $T_{max}$ so as to perform integration of the sum signal (A+B) for $T_{max}$ and to calculate the number of pulses $P_{A+B}$ (steps 104 and 105). If the number of pulses $P_{A+B}$ is smaller than the minimum number $P_{min}$ again in step 105', the microcomputer 9 determines that the object is at the infinite position.

In this manner, since the infinity position is determined in accordance with two conditions of the integration periods and the integrated values, it can be determined with higher precision if the object is at the infinity position or within the measurable range.

FIG. 10 shows a circuit diagram of another embodiment of the present invention. The same reference numerals as in FIG. 5 denote the same parts in FIG. 10. The embodiment shown in FIG. 10 is different from that shown in FIG. 5 in that separate switches 8-1 and 8-2 are arranged for respective portions 5a and 5b of a photosensor 5, and the switches are turned on by signals $M_1$ and $M_2$ from a microcomputer 9.

Figure 11:
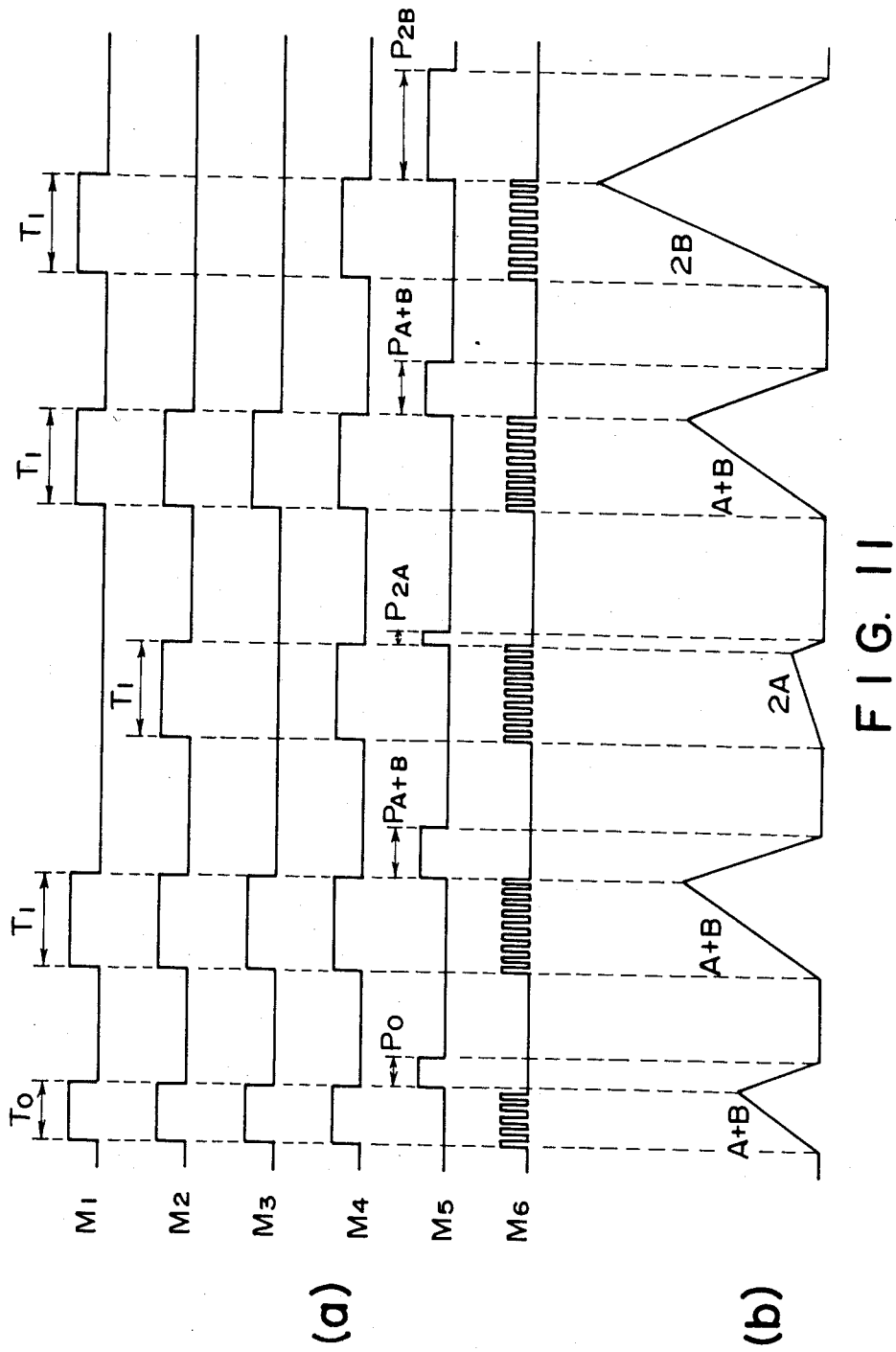
FIGS. 11(a) and 11(b) are timing charts for explaining the mode of operation of the embodiment shown in FIG. 10.

The operation of the embodiment shown in FIG. 10 will be described with reference to the timing chart (FIG. 11) and the program flow (FIG. 12) of the microcomputer 9. In order to perform integration of the sum signal (A+B), the microcomputer 9 generates timing signals M1 and M2 to turn on the analog switches 8-1 and 8-2 for a preset time period $T_0$. When the analog switches 8-1 and 8-2 are turned on, a projection element 1 emits light and light reflected by the object is received by both the portions 5a and 5b. A sense amplifier 10 then generates a sum signal (A+B). Meanwhile, the microcomputer 9 generates a timing signal $M_3$. The timing signal M3 is supplied as a low-level signal to a gain control circuit 12 through an inverter 13. The gain control circuit 12 supplies the input sum signal (A+B) received through a high pass filter 11 to the next analog switch 14 without increasing its gain. As can be seen from FIG. 11a, the microcomputer 9 is generating timing signals $M_4$ and $M_6$. Therefore, the analog switches 14 and 16 are turned on or off in response to the timing signals $M_4$ and $M_6$, respectively; they are turned on in synchronism with the corresponding projection timings of the element 1. In the same manner as in the embodiment shown in FIG. 5, the sum signal (A+B) supplied to the gain control circuit 12 is supplied to an integrating circuit 17 and is integrated for the period $T_0$ shown in FIG. 11(b) (step 101 in FIG. 12). When the integrating circuit 17 integrates the sum signal (A+B) for the time period $T_0$, the microcomputer 9 starts generating a timing signal $M_5$ to turn on the analog switch 15. Then, reverse integration is started (FIG. 11(b)) by a constant negative current i and the number of pulses $P_0$ is counted as in the embodiment shown in FIG. 5 (step 102). Thereafter, as in the embodiment shown in FIG. 5, the next integration period $T_n$ is calculated in step 103.

Thereafter, the microcomputer 9 generates calculated period ($T_1$) timing signals $M_1$ to $M_4$ and $M_6$. Thus, the sum signal (A+B) is integrated for the period $T_1$. The timing signal M5 is then generated to perform reverse integration by the constant current i (step 104) and the number of pulses $P_{A+B}$ obtained by A/D-converting the integrated value of the sum signal (A+B) is obtained. The obtained number of pulses $P_{A+B}$ is stored in the microcomputer 9. When the above operation is completed, the microcomputer 9 generates timing signals $M_2$, $M_4$ and $M_6$ again (FIG. 11(a)). In this case, since the timing signals $M_1$ and $M_3$ are not output, the analog switch 8-1 is OFF and the gain control circuit 12 is set in the mode for setting a gain of 2. Only the portion 5a receives light, and the signal 2A double the output signal A is integrated (step 106). Since another timing signal M5 is generated next, reverse integration is performed by the constant current i, and the number of pulses $P_{2A}$ obtained by A/D conversion of the integrated value of the doubled signal 2A is obtained (step 107).

The microcomputer 9 compares the numbers of pulses $P_{A+B}$ and $P_{2A}$ obtained in the manner described above and determines the light-receiving state (spot beam S) of the portions 5a and 5b from the object. More specifically, the microcomputer 9 checks if the spot beam S is incident more on the portion 5a ($P_{A+B} > P_{2A}$) or on the portion 5b ($P_{A+B} > P_{2A}$) as in FIG. 13. When it is assumed that most of the beam spot S is incident on the portion 5b, as shown in FIG. 13, the level of the signal obtained by integrating the signal 2A is low and has a low S/N ratio. In addition, when the integrated value of the signal 2A is A/D-converted, a ratio of the noise component to the signal component is high. Therefore, even if the level of the signal 2A changes, the quantization error upon A/D conversion remains the same. Therefore, the ratio of the quantization error to the signal component upon A/D conversion of the signal 2A having a low level becomes high, and the resultant signal has a large noise component. When automatic focus control is performed using this signal, direction discrimination (far-in-focus state or near-in-focus state) can be determined. However, when a state near the in-focus state is detected and speed control of the driving motor 7 is thereupon performed or such a state is displayed, speed variations or display flickering occurs. The above determination is performed in order to eliminate these problems.

When the relation $P_{A+B} > P_{2A}$ is satisfies, i.e., when the spot beam S becomes incident more on the side of the portion 5b as in FIG. 13, the microcomputer 9 selects the signal B from the portion 5b and not one from the portion 5a as one signal, and generates timing signals $M_1$, $M_2$, $M_3$, $M_4$ and $M_6$ for a time period $T_1$ in order to perform re-detection of distance using the integrated value of the doubled signal 2B. When the timing signals $M_1$ and $M_2$ are generated, the analog switches 8-1 and 8-2 are turned on and the sum signal (A+B) of the output signals A and B from the portions 5a and 5b is integrated as in the previous operation (step 109). Reverse integration is then performed to calculate the number of pulses $P_{A+B}$ (step 110). The integration of the doubled signal 2B of the signal B from the portion 5b is performed (in this case, the microcomputer 9 stops generating the timing signal $M_2$ (FIG. 11(a)) and instead generates a timing signal $M_1$ (step 111)). Reverse integration is performed to calculate the number of pulses $P_{2B}$ (FIG. 11(b)) (step 112).

Based on the numbers of pulses $P_{A+B}$ and $P_{2B}$ obtained in this manner, the microcomputer 9 operates ($P_{2B}/P_{A+B}$) in step 113 to determine the in-focus state or the out-of-focus state (near-in-focus or far-in-focus state) as in the embodiment shown in FIG. 5 and, at the same time, the pulse width of the automatic focus control signal N to be supplied to the driving motor 7 is modulated (PWM). If $P_{A+B} P_{2A}$, then ($P_{2A}/P_{A+B}$) (step 114). Thus, the rotational direction and speed of the driving motor 7 are controlled (step 115).

According to this embodiment, the sum signal (A+B) and the signal 2A are integrated. When the integrated value of the signal 2A is smaller than that of the sum signal (A+B), the signal 2B is used as one signal, i.e., the signal 2B having a level higher than the signal 2A is used. Therefore, $P_{A+B} < P_{2B}$ is satisfied and the ratio of the quantization error to the signal component in the signal obtained by A/D conversion is small and the result signal has a high S/N ratio. Therefore, high-precision automatic focus control can be performed. When the focusing state approaches the in-focus state, the relation $P_{A+B} \approx P_{2B} (\approx 2A)$ is obtained. When the following condition is set:

$$P_{A+B} = j \cdot P_{2B} (= j \cdot P_{2A})$$

for $j > 1.0$ and the switching characteristics between the signals $P_{2A}$ and $P_{2B}$ have hysteresis, switching between the portions 5a and 5b (analog switches 8-1 and 8-2) can be performed smoothly and the adverse influence of hunting or the like can be eliminated.

The above embodiment has been described with reference to an apparatus of a type which obtains distance information based on the integrated value of the sum signal (A+B) and the integrated value of the signal A. However, the present invention is similarly applicable to an apparatus of a type wherein one signal is integrated for a preset time period, the integrated value is reverse-integrated by the sum signal to obtain a reverse integration time until the integrated value reaches the initial level, and the distance information is obtained in accordance with the relationship between the reverse integration time and the preset time period, to an apparatus of a type having two sets of circuits which can simultaneously integrate the sum signal and one signal, or to an apparatus of a type which does not integrate signals but directly obtains distance information from the repsective signals.

In summary, the present invention provides a distance detection apparatus which can prevent saturation of the signal level and can perform reliable distance detection without the adverse influence of the offset voltage.

What is claimed is:

1. A focus detection apparatus having reference signal generating means for emitting a reference signal to an object subjected to distance detection, first and second signal-reception portions which receive a reflection signal of the reference signal from the object, and an integrating circuit for integrating the signal received by said signal-reception portions, said apparatus obtaining distance or focus state data in accordance with an integration output from said integrating circuit, said apparatus comprising:
   (a) an integration control circuit being adapted to operate in:
      a first mode in which a sum signal, corresponding to the sum of the signal from said first signal-reception portion and the signal from a second signal-reception portion, is integrated during a predetermined time period and thereafter, a signal having a predetermined value and polarity opposite to the polarity of the sum signal is integrated by said integrating circuit, and
      a second mode in which a signal from at least said first signal-reception portion is integrated during a predetermined time period by said integrating circuit and thereafter, a signal having said predetermined value and polarity opposite to the polarity of the signal from said at polarity opposite to the polarity of the signal from said at least said first signal-reception portion is integrated by an integrating circuit, said integration control circuit time sequentially switching said first and second modes;
   (b) a data formation circuit for obtaining a first data corresponding to a first time period needed for the integration value of said predetermined value signal to reach a predetermined value from the start of the integration in said first mode, and a second data corresponding to a second time period needed for the integration value of said predetermined value signal to reach a predetermined value from the start of the integration in said second mode; and
   (c) a discrimination circuit for discriminating a focus state or an object distance on the basis of said first and second data obtained in said data formation circuit.

2. An apparatus according to claim 1, wherein a signal output from said first signal-reception portion during the integrating operation of the signal from said first signal reception portion in said second mode is controlled to be N times a signal from said first signal-reception portion during the integrating operation of said summing signal in said first mode.

3. An apparatus according to claim 2, wherein N is two.

4. A focus detection apparatus in which: the light flux from an object is received by a sensor; a first signal corresponding to a light reception position on said sensor is detected; a second signal independent from the light reception position of the light flux on said sensor is detected; and a focus state or an object distance is determined on the basis of the relationship between said first and second signals, said apparatus comprising:
   (a) an integrating circuit;
   (b) an integration control circuit being adapted to operate in:
      a first mode in which said first signal is integrated during a predetermined time period by said integrating circuit and thereafter, a signal having a predetermined value and polarity opposite to the polarity of said first signal is integrated, and
      a second mode in which said second signal is integrated during a predetermined time period and thereafter said predetermined value signal having a polarity opposite to the polarity of said second signal is integrated, said integration control circuit time-sequentially switching between said first and second modes;
   (c) a data formation circuit for obtaining a first data corresponding to a first time period needed for the integration value of said predetermined value signal to reach a predetermined value from the start of the integration in said first mode, and a second data corresponding to a second time period needed for the integration value of said predetermined value signal to reach a predetermined value from the start of the integration in said second mode; and
   (d) a discrimination circuit for discriminating a focus state or an object distance on the basis of said first and second data obtained in said data formation circuit.

5. An apparatus according to claim 4, wherein said apparatus comprises means for level-adjusting said first and second signals, respectively, with different amplification ratios and for respectively integrating said first and second signals.

6. A detection apparatus having signal reception means for receiving a signal from an object, and an integrating circuit for integrating the signal received by said signal-reception means, said apparatus obtaining distance or focus state data in accordance with an integration output from said integrating circuit, said apparatus comprising:

(a) an integration period determination circuit for determining the next integration period in accordance with the ratio of the previous integration period to the integration value obtained by integration in said previous integration period when said integrating circuit repeatedly performs integration; and (b) an operation circuit for obtaining distance or focus state data based on an output from said integrating circuit which is obtained by integration.

7. An apparatus according to claim 6, wherein said signal-reception means provides a first signal changing in accordance with the deviation of the position at which the light flux enters into the signal reception-means from a reference position when the light flux from the object enters into a predetermined position, and a second signal having approximately twice as large a signal as the value of said first signal when the light flux is in said reference position independently from the position of the light flux, wherein said integrating circuit repeatedly executes an integration cycle in which said first and second signals are independently integrated, and a next integration period is determined in accordance with the ratio of the integration period of said second signal in a previous integration cycle to the integration value of said second signal in the previous integration cycle.

8. An apparatus according to claim 6 wherein said operation circuit comprises detecting means for detecting if the integration period determined by said integration period determination circuit is longer than a predetermined time period, and discriminating means for discriminating if an integration output of the integration operation has reaches a predetermined reference value, whereby an infinity position of the object is detected when said detecting means detects that the integration period is longer than the predetermined time period and said discriminating means discriminates that the integration output has not reached the predetermined reference value.

9. A distance detection apparatus having a signal-reception means for receiving a signal from an object, said signal-reception means having first and second output parts, and an operation circuit for obtaining distance or focus state data based on a sum signal corresponding to a sum of signals from said first and second output parts and a signal corresponding to the signal from the first or second output part, said apparatus comprising:

(a) detecting means for detecting and comparing magnitudes of the signals from said first and second output parts; and (b) a selection circuit for supplying a signal corresponding to the larger signal detected by said detecting means to said operation circuit and for allowing calculation of the distance or focus state data based on the signal therefrom and the sum signal.

10. An apparatus according to claim 9, wherein said signal-reception means has a first signal reception portion associated with said first output part and a second signal reception portion associated with said second output part, and wherein said detecting means compares the sum signal with the signal from said first and second signal-reception portion, and wherein said selection circuit selects a signal from said first or second signal-reception portion which has a predetermined relationship with the sum signal and supplies the selected signal to said operation circuit.

11. An apparatus according to claim 10, wherein said apparatus comprises an integration circuit for integrating the sum signal and the signal from said first or second signal-reception portion, and said detecting means compares the sum signal with the signal from said first or second signal-reception portion based on each integration output.

12. A detection apparatus having a signal-reception means for receiving a signal from an object having a first and second output parts and an operation circuit for obtaining distance or a focus state data based on a sum signal corresponding to a sum of signals from said first and second output parts and a signal corresponding to the signal from said first or second output part, said apparatus comprising:

(a) an integrating circuit for independently integrating said sum of signals and a signal from said first or second output part; and (b) a level adjusting circuit for respectively changing the signal levels of the sum or the signals and the signal from said first or second output parts with different amplification ratios, said operation circuit obtaining a distance or a focus state on the basis of the integration value of the sum of signals integrated by said integrating circuit and the integration value of a signal from said first or second output part.

* * * * *

UNITED STATES PATENT AND TRADEMARK OFFICE
CERTIFICATE OF CORRECTION

PATENT NO. : 4,758,082
DATED : July 19, 1988
INVENTOR(S) : SUSUMU KOZUKI, ET AL.

It is certified that error appears in the above-identified patent and that said Letters Patent is hereby corrected as shown below:

SHEET 2 OF DRAWINGS

FIG. 3, Block 15, "SUBTRACTOR" should read --SUBTRACTER--.

COLUMN 1

Line 17, "reflected" should read --is reflected--.
    Line 22, "5aand" should read --5a and--.
    Line 50, "photosensor 7" should read --photosensor 5--.
    Line 66, "subtractor 15," should read --subtracter 15,--.
    Line 67, "subtractor 15" should read --subtracter 15--.

COLUMN 2

Line 36, "difference" should read --different--.

COLUMN 5

Line 3, "directly" should read --directly--.
    Line 22, "microcomputer 19" should read --microcomputer 9--.
    Line 48, "FIG. 6(b0" should read --FIG. 6(b)--.

COLUMN 7

Line 28, "$T'_1=T_{411}$," should read --$T'_1=T''_1$,--.
    Line 45, "gain control circuit 20" should read --gain control circuit 12--.

UNITED STATES PATENT AND TRADEMARK OFFICE
CERTIFICATE OF CORRECTION

PATENT NO. : 4,758,082
DATED : July 19, 1988
INVENTOR(S) : SUSUMU KOZUKI, ET AL.

It is certified that error appears in the above-identified patent and that said Letters Patent is hereby corrected as shown below:

COLUMN 8

Line 8, "photosensor 3" should read --photosensor 5--.

COLUMN 10

Line 9, "$(P_{A+B} > P_{2A})$" should read --$(P_{A+B} < P_{2A})$--.
Line 31, "satisfies," should read --satisfied,--.
Line 58, "$P_{A+B} P_{2A}$," should read --$P_{A+B} < P_{2A}$,--.

COLUMN 11

Line 4, "$P_{A+B=P2B}(\approx 2A)$" should read --$P_{A+B} \approx P_{2B}(\approx 2A)$--.
Line 29, "directly" should read --directly--.
Lines 62-63, "polarity opposite to the polarity of the signal from said at" should be deleted.

COLUMN 13

Line 21, "independently" should read --independently--.
Line 24, "independently" should read --independently--.
Line 30, "claim 6" should read --claim 6,--.
Line 36, "reaches" should read --reached--.

UNITED STATES PATENT AND TRADEMARK OFFICE
CERTIFICATE OF CORRECTION

PATENT NO. : 4,758,082
DATED : July 19, 1988
INVENTOR(S) : SUSUMU KOZUKI, ET AL.

It is certified that error appears in the above-identified patent and that said Letters Patent is hereby corrected as shown below:

COLUMN 14

Line 31, "a" (second occurrence) should be deleted.
    Line 38, "independently" should read --independently--.
    Line 42, "or" should read --of--.

Signed and Sealed this

Third Day of October, 1989

Attest:

DONALD J. QUIGG

*Attesting Officer*    *Commissioner of Patents and Trademarks*